Sept. 6, 1960 J. J. SLOMER 2,951,580
TENSION CONTROL APPARATUS FOR BELT STORAGE
LOOP OF AN EXTENSIBLE BELT CONVEYOR
Original Filed July 1, 1957 2 Sheets-Sheet 1
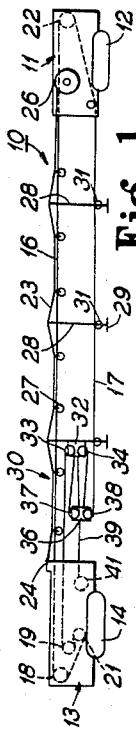
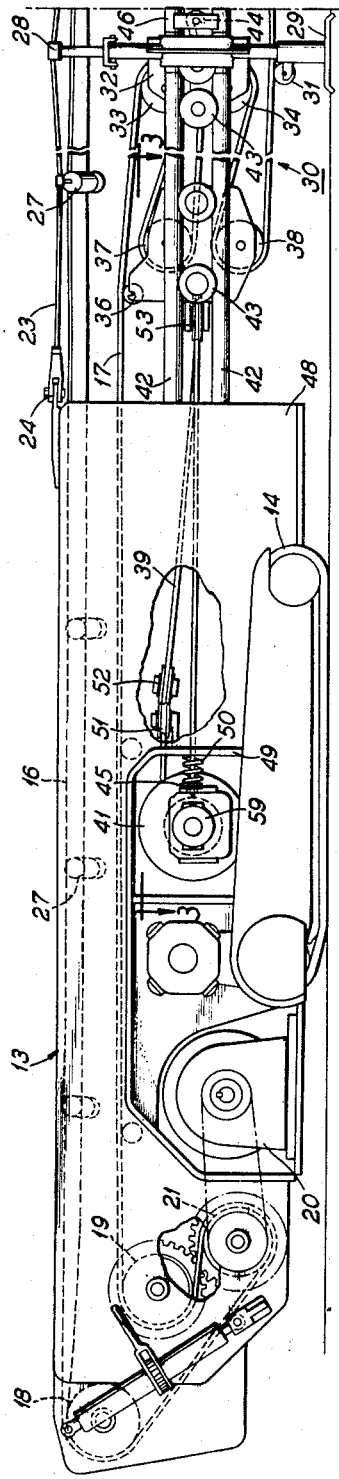
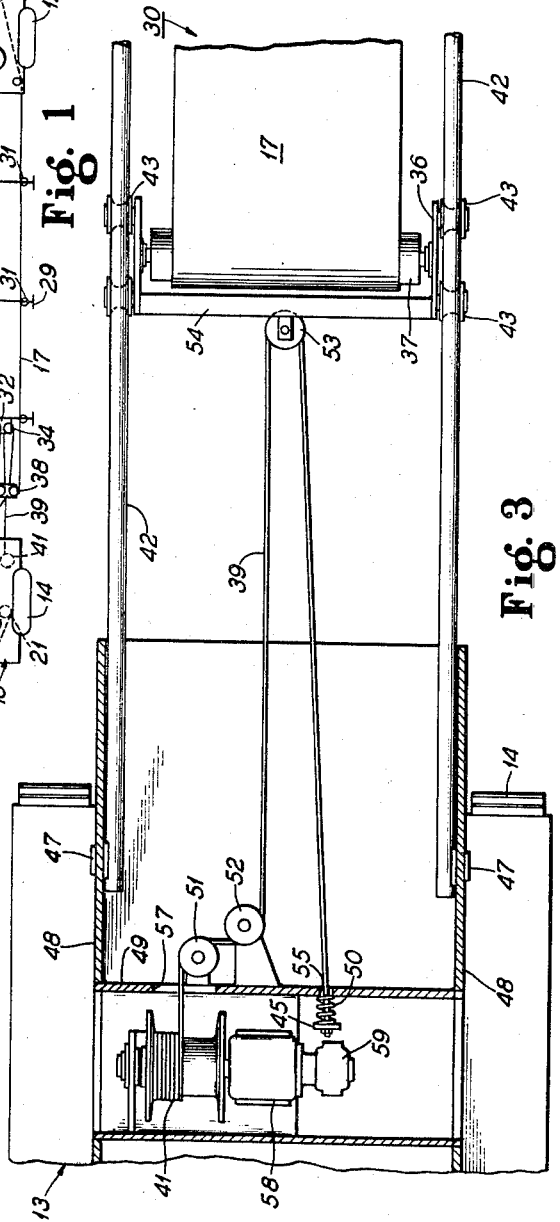
INVENTOR.
Joseph J. Slomer
BY
*Murray A. Gleeson*
ATTORNEY

United States Patent Office 2,951,580
Patented Sept. 6, 1960

2,951,580

TENSION CONTROL APPARATUS FOR BELT STORAGE LOOP OF AN EXTENSIBLE BELT CONVEYOR

Joseph J. Slomer, Chicago, Ill., assignor to Goodman Manufacturing Company, Chicago, Ill., a corporation of Illinois Continuation of application Ser. No. 669,305, July 1, 1957. This application Apr. 23, 1958, Ser. No. 730,471

8 Claims. (Cl. 198—208)

This invention relates to apparatus for maintaining proper tension on a belt conveyor, this invention being especially advantageous when applied to an extensible type conveyor.

This application is a continuation of application Serial No. 669,305, filed July 1, 1957.

One of the principal objects of this invention is to provide a hydraulic system for accurately controlling the tension of the belt in a belt conveyor, such system being controlled by the condition of a combination motor-pump unit for winding in and paying out a flexible strand connected to a movable idler assembly around which the belt is reeved to form a belt storage and take-up loop.

Another object is to provide auxiliary control means including a valve in such a hydraulic system, which valve is selectively actuatable to: enable the belt tension to be controlled automatically; slacken the belt tension slowly; or rapidly drive the motor-pump in a direction to release the belt tension, as for reeving a new length of belt into the conveyor.

Still another object is to provide a hydraulic pressure system for maintaining the tension in an elastic conveyor belt betwen limits, such belt on account of its elasticity acting as an accumulator and regulating the operation of an unloading valve which controls the pressure in a pressure line leading to the motor-pump, whereby the unsure loading valve unloads at a pressure corresponding to an upper limit of belt tension and loads at a pressure corresponding to a lower limit of belt tension, and the elasticity of the belt effectively maintains a reasonably low loading-unloading frequency. The accumulator effect of the belt in controlling the unloading valve varies with length and elasticity of the belt; accordingly this invention uses supplemental elastic means to supplement the elasticity of the belt in the case of a short, relatively nonelastic belt, in addition to a hydraulic type accumulator in the pressure line when required.

Other objects and important features of the invention will be apparent from a study of the specification following taken with the drawings which together describe and illustrate a preferred embodiment of the invention, and what is now considered to be the best mode of practicing the principles thereof. Other embodiments may be suggested to those having the benefit of the teachings herein and such other embodiments are intended to be reserved especially as they fall within the scope and spirit of the subjoined claims.

In the drawings:

Fig. 1 is a schematic elevational view of an extensible belt conveyor having the improvements according to the present invention embodied therein;

Fig. 2 is an elevational view of the head section of the extensible conveyor seen in Fig. 1, said view showing details of the tension control apparatus according to the present invention;

Fig. 3 is a plan view of a portion of the head section seen in Fig. 2, showing details of a tension controlling device for maintaining tension upon the belt storage loops of the extensible conveyor seen in Fig. 1.

Figure 4:
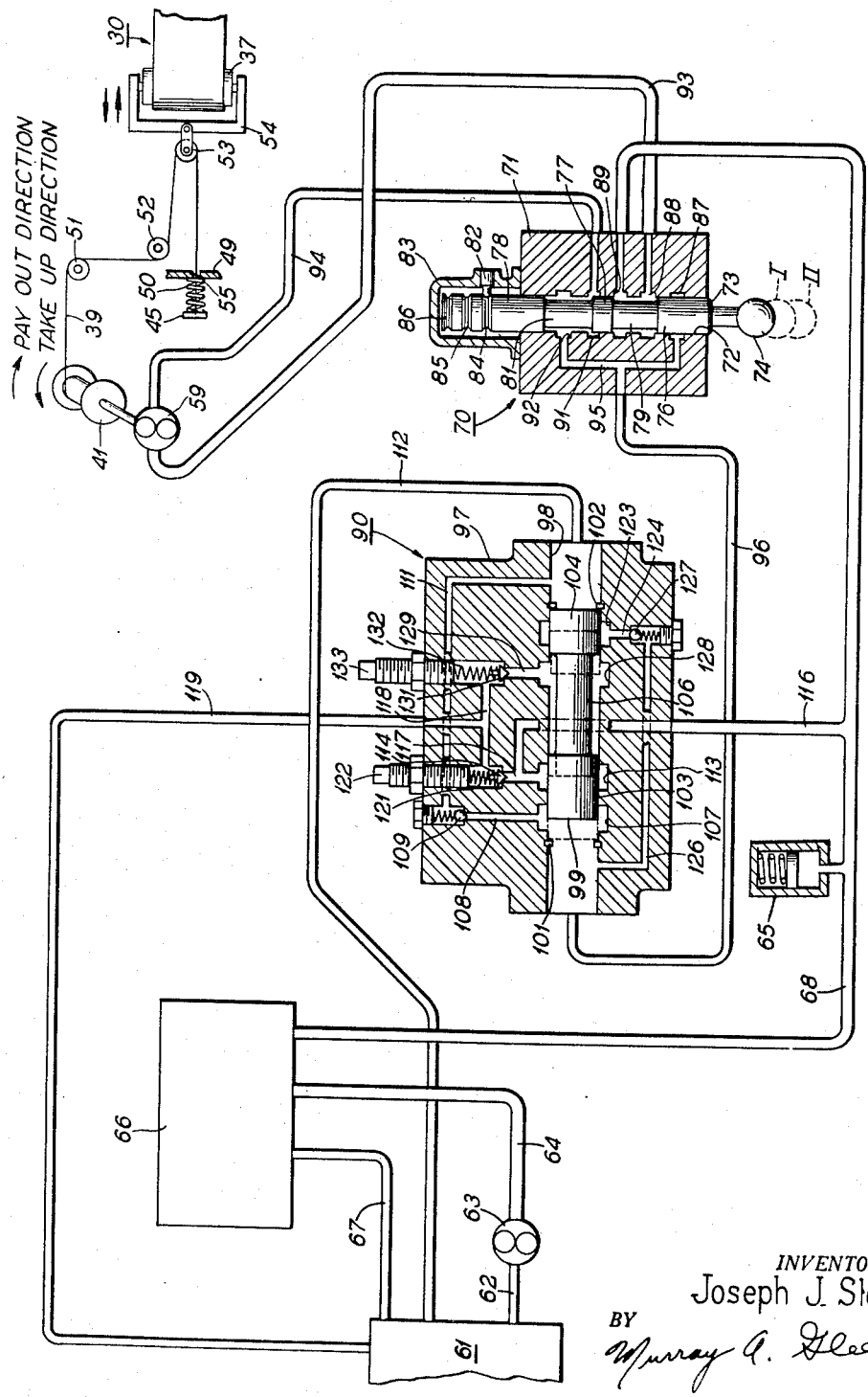
Fig. 4 is a hydraulic circuit for controlling the tension of the belt storage loops of the conveyor seen in Figs. 1 to 3.

Referring now particularly to Fig. 1 of the drawings there is shown an extensible belt conveyor indicated generally by the reference numeral 10 and including a tail section 11 mounted for movement upon crawler treads 12. The conveyor 10 also includes a head section 13 mounted for movement upon crawler treads 14. An extensible belt extends between the tail section 11 and head section 13 and has a conveying reach 16 and a return reach 17. The conveying reach 16 is reversed in direction by an idler pulley 18 at the head section 13 and snubbed around a pair of driving pulleys 19 and 21 driven by a motor 20. The return reach 17 is reversed in direction about an idler pulley 22 at the tail section 11.

The extensible conveyor 10 is of the type where the conveying reach 16 is supported upon laterally spaced flexible cables or strands 23, one end of each strand being anchored at 24 to the head section 13, and the other end of each strand 23 being wound upon a storage reel 26 at the tail section 11. The conveying reach 16 is supported upon troughing assemblies 27 suspended across the laterally spaced strands 23, and the strands 23 are supported at intervals throughout their length upon standards 28, each having a ground engaging foot 29 and a return idler 31 for supporting the return reach 17.

The return reach 17 is folded back and forth upon itself to form a belt storage loop indicaed generally by the reference numeral 30 and located adjacent the inby end of the head section 13. Belt storage loop 30 has a fixed idler assembly 32 with idler rollers 33 and 34 and a movable idler assembly 36 with idler rollers 37 and 38. The return reach 17 is reeved between the aforesaid idler rollers. Tension is maintained upon the belt storage loop 30 by means of a cable 39 connected to the movable idler assembly 36 and wound upon a winch drum 41, details of which will be described as this specification proceeds.

As seen in Figs. 2 and 3, the standards 28 inby of the head section 13 are arranged to support laterally spaced pairs of rails 42, and each of the idler asesmblies 32 and 36 is provided with guide wheels 43 which engage the rails 42. Fixed idler assembly 32 is anchored by a hook 44 to an abutment 46 extending between the laterally spaced rails 42.

As seen in Fig. 3, the pair of laterally spaced rails 42 extend inby of the head section 13 and are pivotally mounted as at 47 to a vertical side frame 48. A vertical cross frame member 49 extends between the two side frames 48 and provides a support for spaced idler sheaves 51 and 52 for the strand 39, see Fig. 1. Strand 39 is reeved about an idler sheave 53 disposed on a cross frame member 54 of the idler carriage 36, one end of the cable 39 extending through an opening 55 in the cross frame member 49 and having a keeper 45 at the end thereof. A spring 50 encircles the cable 39 between the keeper 45 and the cross frame member 49 and serves to supplement the elasticity of the belt when the latter is short and relatively non-elastic to minimize the frequency of operation of the automatic tensioning apparatus to be described.

As seen in Fig. 3, the cross frame member 49 has an opening 57 therein for passage of the cable 39 which is wound upon the drum 41, it being driven through a gear train 58 connected to a fluid operated motor-pump 59 which is supplied with hydraulic pressure fluid to operate as a motor to drive the winch 41 and wind the cable 39 thereon to maintain the proper tension upon the belt storage loop 30. Conversely, an excess of tension in the belt storage loop 30 will pull cable 39 off the drum 41, the motor-pump 59 during such time being driven as a pump.

Referring now to Fig. 4 of the drawings, there is shown a hydraulic control system for control of the motor-pump 59 and of the tension in the belt.

The hydraulic control system shown consists of a tank or reservoir 61 connected by a conduit 62 to a pump 63, an output line 64 therefrom being connected to an unloading valve 66. The unloading valve 66 is of the type to impose substantially no back pressure against the pump 63 when the valve is in the unloading position, and the valve 66 may be of the type as disclosed in Slomer Patent No. 2,661,755, issued December 8, 1953, for Unloading Valve for Fluid Pressure Systems. The by-passed fluid from the valve 66 returns to the reservoir 61 by a return line 67, and the valve 66 maintains pressure at a predetermined value in a pressure line 68.

In order to prevent the unloading valve 66 from cycling by reason of only very small demands for pressure fluid by motor-pump 59, an extra volume of pressure fluid is maintained in a piston type accumulator 65 connected to pressure line 68. The provision of such an accumulator is indicated particularly where the conveyor 10 is quite short, and relatively non-elastic, as will appear as this specification proceeds.

For purposes of discussion herein, unloading valve 66 is adjusted to unload at 800 p.s.i. and to load at pressures of 600 p.s.i. or less.

An auxiliary, manually operated, control valve for the motor-pump 59, indicated generally by the reference numeral 70 consists of a valve block 71 having a bore 72 with a spool valve member 73 slidable in the bore 72. The spool valve member 73 has a control handle 74, an end land 76 and a center land 77, and an opposite end land 78, lands 76 and 77 being separated by a portion of reduced diameter 79 and lands 77 and 78 being separated by a portion of reduced diameter 81.

The position of the spool valve member 73 within the bore 72 is maintained by a spring-biased detent 82 supported in an end cover or cap 83 for the valve 70. The spring detent 82 is positioned in one of the spaced annular detent slots 84, 85 and 86 under conditions as will be described.

The valve bore 72 is provided with spaced annular ports 87, 88, 89, 91 and 92. When the valve spool 73 is in the solid line position shown in Fig. 4, fluid pressure will be manifested at the ports 88 and 89, port 89 being connected to the pressure line 68 and port 88 being connected to the working line 93 connected to the motor-pump 59. A return line 94 from the motor-pump 59 is connected to the port 91, port 91 being connected past the reduced diameter portion 81 to the port 92. A line 96 is connected to a passageway 95 in turn connected to the ports 87 and 92. Line 96 in turn is connected to a combined automatic flow control and relief valve indicated generally by the reference numeral 90.

Valve 90 is arranged in the hydraulic control system of Fig. 4 for putting pressure line 68 under control of low pressure relief valve 131 when strand means 39 is being drawn off the winding member 41 and the motor-pump 59 is thereby being driven as a pump. Valve 90 consists of a valve body 97 having a bore 98 therein with a spool valve member 99 shiftable within the bore 98, the limits of travel of the spool valve member 99 being determined by C-rings 101 and 102.

The spool valve member 99 has a pair of end lands 103 and 104 separated by a portion of reduced diameter 106. The exhaust fluid from the motor-pump 59 when acting as a motor urges the spool member to the right, as shown, and is returned to the tank 61 through the valve 90 past an annular port 107 connected to a passageway 108. A ball check valve 109 is seated at the juncture of passageway 108 and a passageway 111 connected to the valve bore 98 beyond the opposite end land 104, a return line 112 being connected to the valve body 97 thereat and to the tank 61.

In the Fig. 4 position of spool valve member 99, the land 103 blocks an annular port 113, so the pressure within the high pressure supply line 68 may be relieved at the setting of a relief poppet valve 114. To furnish the necessary communication, a line 116 branching from the line 68 is connected to a passageway 117, the poppet 114 being seated at the juncture of the passageway 117 and a passageway 118 connected to a line 119 to the reservoir 61. The setting of the poppet valve 114 is determined by a spring 121 adjusted in its tension by a screw type adjustor 122.

In the operation of the motor-pump 59 to maintain tension on the belt storage loop 30, each strand of belting of such belt storage loop is maintained, by way of example only and not limitation, at a minimum tension value of the order of 800 pounds and a maximum tension value of the order of 1200 pounds. When the minimum value is reached the motor-pump 59 is actuated as a motor to drive winch 41 in a winding direction to build up the tension in the belt storage loop to the maximum, such maximum being determined by the setting of the unloading valve 66. However, poppet 114 may be set at 1000 p.s.i. which is approximately 200 p.s.i. higher than the unloading pressure of valve 66 merely as a safety measure, in the event of failure of valve 66.

Upon increase in length of the conveyor 10, the belt storage loop is correspondingly shortened, and during such shortening the flexible strand 39 will be pulled from the winch 41 to thereby drive the motor-pump 59 as a pump. Under such condition, the conduit 94 becomes a supply line to the motor-pump 59, while line 93 becomes the discharge line.

Under this latter described condition lines 94 and 96 connected to motor-pump 59 will be at a suction pressure sufficient to shift the spool valve member 99 to the left to the dotted line position shown. Such shifting of the spool valve member 99 will unlap an annular port 123 connected to a passageway 124. A passageway 126 connects the left end of the bore 98 to the passageway 124 within the valve 97 and a check valve 127 is disposed at the juncture of passageways 124 and 126. The line 112 to the reservoir 61 will thus be connected through the valve body 97 to the conduit 96 to supply fluid to the motor-pump 59 while acting as a pump.

In the just described position of the spool valve member 99 the annular port 113 will be unlapped, and communication will be had between pressure line 116, passageway 117, annular port 113, past the reduced diameter portion 106 to an annular port 128. A passageway 129 connects with the annular port 128 and a low pressure poppet type relief valve 131 is seated at the juncture of passageways 129 and 118. The relief valve 131 is set at a lower relief pressure than the unloading pressure of valve 66, its relief pressure being adjusted by a spring 132 and a screw adjustment 133. In the present example, it will be set below 800 p.s.i., for instance in the neighborhood of 400 p.s.i.

The output from the motor-pump 59 while acting as a pump will thus discharge by means of the line 93 past ports 88 and 89 of the control valve 70 and through the line 68 and line 116 through the valve body 97 as described, at a relief pressure designed to maintain the tension on the strands of the belt storage loop at not more than the maximum value of 1200 pounds as would be maintained by the motor-pump 59 acting as a motor.

The unloading valve 66 is set to unload at a pressure of about 200 p.s.i. less than the pressure setting of the high pressure safety or relief valve 114. This unloading pressure of unloading valve 66 (800 p.s.i) will be maintained when the motor-pump 59 is in the stalled condition. At such time the pump 63 will be discharging to tank 61 through the unloading valve 66 at substantially no back pressure. When the motor-pump unit 59 is acting as a pump and the shuttle valve 99 has adopted the dotted line position shown, the motor-pump 59 will be pumping against a back pressure as determined by the low pressure relief valve 131, a pressure lower than the loading pressure (600 p.s.i) of valve 66. At such time the unloading valve 66 will move to the loading position, and the pump 63 will be pumping into the pressure lines 68 and 116 at a pressure corresponding to the low pressure relief valve 131. At this time both the output of pump 63 and of motor-pump 59 acting as a pump will flow through line 116, through low pressure relief valve 131 and cycle to tank.

If the conveyor 10 is long enough, moderate changes in length thereof can be accommodated without changing the tension in the belt or in the cable 39 appreciably. This is by reason of the fact that the conveyor belt has a certain elasticity. It is thus possible in a long conveyor for the tail section 11 to retreat or advance without requiring frequent pay-out or take-up operations of the motor-pump.

It is possible therefore to accommodate a change in the length of the conveyor without requiring motor-pump 59 to be driven as a motor during shortening of the conveyor or to be driven as a pump during lengthening. In a long conveyor, therefore, there need be no accumulator 65 or load spring 50, in such case strand 39 being anchored to the cross frame 49. The unloading valve 66 need cycle to loading position to supply motor fluid to motor-pump 59 only when belt tension drops by shortening of the conveyor and lengthening of the storage loop 30. Only at such times need the motor-pump 59 be driven as a motor.

On the other hand, when the conveyor lengthens and the loop 30 is therefore tensioned to its upper limit, the loop contracts while motor-pump 59 is driven as a pump. Since the shuttle valve 90 during such condition moves to the dotted line position, motor-pump 59 has a back pressure thereon as determined by low pressure relief valve 131. At such time unloading valve 66 moves to the loading position as previously described.

In a short conveyor, within the limits of elastic deformation of the reaches, a small change in length will cause large changes in the belt stress. In order to maintain the stress at the proper upper and lower limits, the length of the storage loop much change (quite often as compared to the case where the conveyor is a long one). Under such conditions the use of the accumulator 65 and load spring 50 is indicated, the back torque on motor-pump 59 lessening or increasing as spring 50 lengthens or shortens.

Upon lengthening of spring 50, therefore, motor-pump 59 must be driven as a motor, and accumulator 65 will supply enough pressure fluid for short periods to prevent unloading valve 66 from cycling. As before, when motor-pump 59 is driven as a pump, valve 66 will cycle, loading at the setting of relief valve 131.

The control valve 70 is arranged to be moved to a position I whereby the belt storage loop 30 can be shortened against the head resistance of the pressure fluid for the motor-pump 59 when moving in a closed loop through the control valve 70. When actuating handle 74 is moved to position I shown, the land 77 will block the port 89, the detent 82 at such time occupying the annular detent slot 85. In this position of the spool valve member 73, the motor-pump 59 can act as a pump in a closed loop, such loop consisting of line 93, through motor-pump 59, line 94, annular port 91, past reduced portion 81 of spool valve member 73, annular port 92, passageway 95, annular port 87, past reduced diameter portion 79 and thence to annular port 88 and line 93.

However, while such position I of the valve 70 would permit shortening of the belt storage loop against a very low back pressure as would be required to move the hydraulic fluid in the aforesaid closed loop, it is sometimes desirable to drive the motor-pump 59 as a motor in a direction opposite to the usual take-up direction previously described, so that a length of belting may readily be withdrawn from the extensible conveyor 10 as desired.

To this end the handle 74 is moved to power unwind position II with the detent 82 in the annular detent slot 86. In this position of the valve spool member 73, the land 77 blocks port 88 from communication with port 89, and pressure fluid in the supply line 68 is available past the reduced diameter portion 81 to the annular port 91 and the line 94 to supply pressure fluid to the motor-pump 59 in the opposite direction. The land 78 of the spool valve member 73 during such time laps the port 92. The spent fluid from motor-pump 59 returns to the control valve 70 by the line 93, the spent fluid moving past the reduced diameter portion 79, past annular port 87 and thence by passageway 95 and line 96 to the valve 90. At such time spool valve member 99 is in the full line position shown, and fluid will be returned to tank by passageways 108 and 111 past check valve 109, and by the tank passageway 112. At such time also the pressure in line 68 will be determined by the setting of the relief valve 114.

While the invention has been described in terms of a preferred embodiment thereof its scope is intended to be limited only by the claims here appended.

I claim as my invention:

1. In a conveyor having an orbitally movable endless belt trained about a tensioning pulley which is movable back and forth to vary the tension in said belt, strand means connected to said pulley and being effective when tensioned to apply a tension in said belt, a winding member about which said strand means is wrapped, improved means for tensioning said belt through said strand means comprising: a motor-pump; a source of fluid under pressure; a pressure line connecting the pressure source and one side of said motor-pump, the other side of said motor-pump being connected to a source of fluid; said motor-pump being connected to said winding member and being operable as a motor by pressure fluid from said pressure line to drive said winding member in a direction to wind said strand means, and being operable as a pump to discharge fluid into said pressure line when said strand means is pulled off said winding member; automatic means for imposing on said motor-pump a reduced back pressure when it is being driven by the winding means and acting as a pump, said automatic means including pressure relief means connected to relieve the pressure in said pressure line, said automatic means also including control means which is automatically actuatable in response to operation of said motor-pump as a pump to render said pressure relief means effective to control the pressure in said pressure line and which is automatically actuatable in response to operation of said motor-pump as a motor to render said pressure relief means ineffective to control the pressure in said pressure line.

2. In a conveyor according to claim 1, auxiliary control valve means being selectively actuatable to direct pressure from said pressure source to said other side of said motor-pump to drive said winding member positively in a direction to pay out strand means.

3. In a conveyor according to claim 1, an auxiliary control valve connected between said pressure source and both sides of said motor-pump, said auxiliary control valve being selectively actuatable to a first position connecting said pressure source to said one side of the motor-pump for automatic control of the pressure in said pressure line by said automatic means and to a second position connecting said pressure source to said other side of the motor-pump for power driving said winding member in an unwinding direction to pay off said strand means.

4. In a conveyor according to claim 1, an auxiliary control valve which is selectively actuatable to and from a position to interconnect both sides of said motor-pump to create a closed loop for the flow of fluid from one side of the motor-pump to the other for enabling the winding member to pay off strand means at a speed determined by the rate at which said motor-pump can pump fluid through said closed loop.

5. In a conveyor having an orbitally movable endless belt trained about a tensioning pulley which is movable back and forth to vary the tension in said belt, strand means connected to said pulley and being effective when tensioned to apply a tension in said belt, a winding member about which said strand means is wrapped, improved means for tensioning said belt through said strand means comprising: a motor-pump; a source of fluid under pressure; a pressure line connecting the pressure source and one side of said motor pump, the other side of said motor-pump being connected to a source of fluid; said motor-pump being connected to said winding member and being operable as a motor by pressure fluid from said pressure line to drive said winding member in a direction to wind said strand means, and being operable as a pump to discharge fluid into said pressure line when said strand means is pulled off said winding member; automatic means for imposing on said motor-pump a high supply pressure when it is operating as a motor and a low back pressure when it is being driven by the winding means and acting as a pump, said automatic means including high and low pressure relief means connected to relieve said pressure line, said automatic means also including control means which is automatically actuatable in response to operation of said motor-pump as a motor, and as a pump, respectively, to control the pressure in said pressure line by said high and low pressure relief means respectively.

6. In a conveyor having an orbitally movable endless belt trained about a tensioning pulley which is movable back and forth to vary the tension in said belt, strand means connected to said pulley and being effective when tensioned to apply a tension in said belt, a winding member about which said strand means is wrapped, improved means for tensioning said belt through said strand means comprising: a motor-pump; a pump; a source of fluid connected to the inlet of said pump; a pressure line connecting the outlet of said pump and one working port of said motor-pump, an opposite working port of said motor-pump being connected to said source of fluid; said motor-pump being connected to said winding member and being operable as a motor by pressure fluid from said pressure line to drive said winding member in a direction to wind said strand means, and being operable as a pump to discharge fluid into said pressure line when said strand means is pulled off said winding member; automatic means for imposing on said motor-pump a high supply pressure when it is operating as a motor and a low back pressure when it is being driven by the winding means and acting as a pump, said automatic means including an unloading valve and a pressure relief valve; said unloading valve being connected in said pressure line between said pump and motor-pump and having a by-pass connection to said source of fluid and being effective, responsive to a predetermined high pressure in that part of said pressure line communicating with the motor-pump to divert pump output through said by-pass line to said source of fluid; said pressure relief valve being connected to relieve said pressure line to said source of fluid; said unloading valve being set to unload at a higher pressure in said pressure line than said relief valve whereby said unloading valve determines the upper limiting pressure in said pressure line when said relief valve is ineffective and whereby said relief valve determines the lower limiting pressure therein when it is effective; and said automatic means also including control means which is automatically actuatable in response to operation of said motor-pump as a motor and as a pump respectively to render said relief valve ineffective and effective respectively.

7. In a conveyor according to claim 6, a hydraulic accumulator connected to said pressure line to minimize the operating frequency of said unloading valve.

8. In a conveyor according to claim 6, said belt having some elasticity, said strand means including elastic means for supplementing elasticity of the belt when the latter is used in short lengths, to thereby minimize the operating frequency of the unloading valve.

References Cited in the file of this patent

UNITED STATES PATENTS

| | | |
|---|---|---|
| 2,640,582 | Madeira | June 2, 1953 |
| 2,763,467 | Doolittle et al. | Sept. 18, 1956 |
| 2,839,021 | Patterson | July 17, 1958 |